United States Patent [19]

Smith

[11] Patent Number: 5,832,068
[45] Date of Patent: Nov. 3, 1998

[54] DATA PROCESSING SYSTEM WITH REAL TIME PRIORITY UPDATING OF DATA RECORDS AND DYNAMIC RECORD EXCLUSION

[75] Inventor: B. Scott Smith, Londonderry, N.H.

[73] Assignee: Davox Corporation, Westford, Mass.

[21] Appl. No.: 689,816

[22] Filed: Aug. 14, 1996

Related U.S. Application Data

[63] Continuation-in-part of Ser. No. 252,339, Jun. 1, 1994, Pat. No. 5,594,790, and a continuation-in-part of Ser. No. 619,164, Mar. 21, 1996, Pat. No. 5,592,543.

[51] Int. Cl.[6] .................................................. H04M 15/00
[52] U.S. Cl. .......................... 379/113; 379/112; 379/114; 379/145; 379/196
[58] Field of Search .................................... 379/111, 112, 379/113, 114, 115, 133, 134, 135, 1, 2, 28, 34, 144, 145, 121, 188, 189, 196, 197

[56] References Cited

U.S. PATENT DOCUMENTS

| | | | |
|---|---|---|---|
| 5,586,175 | 12/1996 | Hogan et al. | 379/112 |
| 5,602,906 | 2/1997 | Phelps | 379/114 |
| 5,627,886 | 5/1997 | Bowman | 379/111 |

*Primary Examiner*—Curtis A. Kuntz
*Assistant Examiner*—Binh K. Tieu
*Attorney, Agent, or Firm*—Daniel J. Bourque, Esq.; Kevin J. Carroll, Esq.

[57] ABSTRACT

A data record processing system including a dynamic data record excluder generates a unique record identification in response to a received data record. Alternatively, the received data record may include the unique data record identifier. A data record index stores at least a portion of the received data record and the unique data record identifier. A dynamic data record excluder determines whether or not the received data record was previously received by searching the data record index, and generates a data record exclusion indicator if the data record was previously received, thereby excluding processing of the previously received data record, to avoid duplication and to allow the data record processing system to process the most recent data record.

24 Claims, 4 Drawing Sheets

DATA PROCESSING SYSTEM WITH REAL TIME PRIORITY UPDATING OF DATA RECORDS AND DYNAMIC RECORD EXCLUSION

RELATED APPLICATION

This application is a continuation-in-part of U.S. patent application Ser. No. 08/252,339, filed on Jun. 1, 1994, and entitled A Method For Selecting and Controlling the Automatic Dialing of a Call Record Campaign, now U.S. Pat. No. 5,594,790 and U.S. patent application Ser. No. 08/619,164, filed on Mar. 21, 1996 and entitled A Method For Allocating Agents With Predetermined Attributes To A Telephone Call Campaign, now U.S. Pat. No. 5,592,543, which are both fully incorporated herein by reference.

FIELD OF THE INVENTION

This invention relates to data record processing telephone systems and in particular, to data record processing systems such as call record processing systems which receive customer records and which dynamically sorts, organizes, prioritizes and control the calling of each customer record by dynamically excluding certain call records.

BACKGROUND OF THE INVENTION

Computer automation has found its way into every facet of data processing including telephone call processing systems. It is now common for organizations who must make and handle large numbers of telephone calls with their customers, such as banks, credit card handling companies and telemarketers, to utilize computerize telephony systems which receive customer account information including a telephone number, and which organize, prioritize and control the calling of each customer account.

Although such existing telephony systems vary extensively, most systems are capable of receiving call records, organizing them in groups or lists, often prioritizing or ordering the call records within the groups, and providing the call records to a telephone dialing mechanism to be called and subsequently connected to an agent who will handle the call. Along with the prior arts systems, however, come several drawbacks. The first drawback relates to the fact that once a call group has established, many systems are incapable of "adding" to the group dynamically, based on some recent event. In addition, most systems are also not capable of dynamically altering the priority of any given selected call record within a group once it has been downloaded or prepared for download to the telephone call record processing system. Such a feature is often an important consideration for certain telephone related applications.

For example, credit card processing organizations are becoming increasingly aware of the marked rise in fraudulent use of credit cards. Since in many occasions any financial losses from fraudulent use of credit cards may rest on the credit card issuer, the issuer has a significant vested interest in and a strong desire to detect fraudulent use of credit cards and most importantly would like to detect even the potential fraudulent use of a credit card as early as possible, in order to minimize losses.

Accordingly, the credit card processing industry has developed a series of "tests" which are applied to credit card usage in an effort to attempt to determine whether a particular credit card is potentially being used fraudulently. For example, one such test includes monitoring the period of time between the date of last use of a credit card and multiple current uses of a credit card. Statistics have shown that if a credit card is not used for an extended period of time and all of a sudden the card is used extensively in a short period of time, chances are that the card has been stolen and is being used fraudulently.

Another test or indicator is the amount or value of the charged transaction. Credit card processors can establish profiles of credit cards users including the average charge amount over a period of time and, if a charge amount is received which exceeds this average amount, a potential exists for fraudulent credit card usage.

In certain circumstances, some credit card processors even assign a numerical "score" value to a customer's account which "score"reflects the relative potential for the existence of fraudulent use of the credit card. As an example, a "score" value of "1" (one) may indicate only a small potential or likelihood for fraudulent usage while a "score" of "10" (ten) in association with a customer's account may indicate a very high probability of fraudulent usage.

In the past, credit card processing organizations have been able to provide groups of customer account records which have been identified as having a potential for fraudulent usage, and have been able to assign such groups to an automated telephone call record processing system for dialing at a later time. Given the Real-Time access to credit card activity which credit card processors now have, it is therefore often possible to spot potential credit card fraud in a short period of time. Therefore, a customer account which has received a low score in terms of probability of fraud during a call record download based on a prior day credit card activities may receive a very high score for probability of fraudulent credit card usage during the present day as credit card transactions are received by the credit card processor.

Given the present limitations in call record processing systems, however, is not possible, in real time, to update an existing customer account call record "score" in a previously downloaded call record list or group to indicate that the relative probability of fraudulent credit card usage has "jumped" from a lower value to a higher value, and to therefore to schedule the call the customer immediately or at least sooner than previously scheduled to verify whether or not the card has been stolen.

In the case of prior art systems, this information will not be downloaded to the call record processing system until the next day, when it may be too late to determine that a credit card has been lost or stolen and to prevent further usage. Similarly, credit card processing activities may, during the middle of the day, indicate potential fraudulent use of a credit card and in this situation, it would also be desirable to immediately add this call record to the list of call records to be processed for that day so that the customer may be immediately called. Additionally, the owner of the card may telephone in to report the loss of the credit card and therefore, it is not necessary to telephone him or her. This customer's name may therefore be immediately removed from the call list.

SUMMARY OF THE INVENTION

Accordingly, the present invention features a data processing system with real time data record updating and dynamic data record exclusion. The dynamic data record excluder of the present invention includes, in the preferred embodiment, a unique data record identifier generator, responsive to at least one received data record, for generating a unique data record identifier. A data record index stores at least a portion of the received data record and the generated unique data record identifier. Unique data record identifiers may be based on one or more of various data record processing elements such as time, date, time of record download, customer account number, download cycle, or data record batch number.

In another embodiment wherein the processing system maintains only one (1) "version" or location in which all data records are stored, the received data records may be compared against previously received data records to determine whether or not the same or previous version of the received data record was previously received in which case the previous version is excluded and the new version is retained to be processed presently or at a later time.

A dynamic data record excluder determines whether the received data record was previously received by comparing at least a portion of the received data record with data stored in the data record index. If a data record referencing the same account number was previously received, the previously received data record is discarded, marked "to be excluded" and/or a data record exclusion indicator is generated, and only the newest record will be processed.

A data record exclusion list is maintained in response to the dynamic data record excluder, for storing the generated data record exclusion indicators or the list of data records to be excluded from processing. The preferred embodiment contemplates that the data record exclusion indicator will include the generated unique data record identifier.

In the preferred embodiment, the dynamic data record excluder of the present invention is utilized in a data record processing system which further includes a data record handler, responsive to the dynamic record excluder and to the data record exclusion list, for storing the received data records in at least one data record table, and for comparing at least a portion of a data record to be processed with the data record exclusion indicators stored in the data record exclusion list. The system also includes a data record processor, responsive to a request for processing a data record, for directing the data record handler to retrieve at least one data record to be processed, and for comparing at least a portion of the retrieved data record to be processed with the data record exclusion indicators, for determining that the data record requested to be processed is not to be excluded, and for processing the request data record.

In the preferred embodiment, the record processor includes a telephone call processing system. In this embodiment, the received data records include a data record priority indication based on the urgency in which a call account record should be called. The urgency may be based on potential for credit card fraud.

The present invention also discloses a method for dynamically excluding records as well as a method for processing data records utilizing a dynamic data record excluder.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
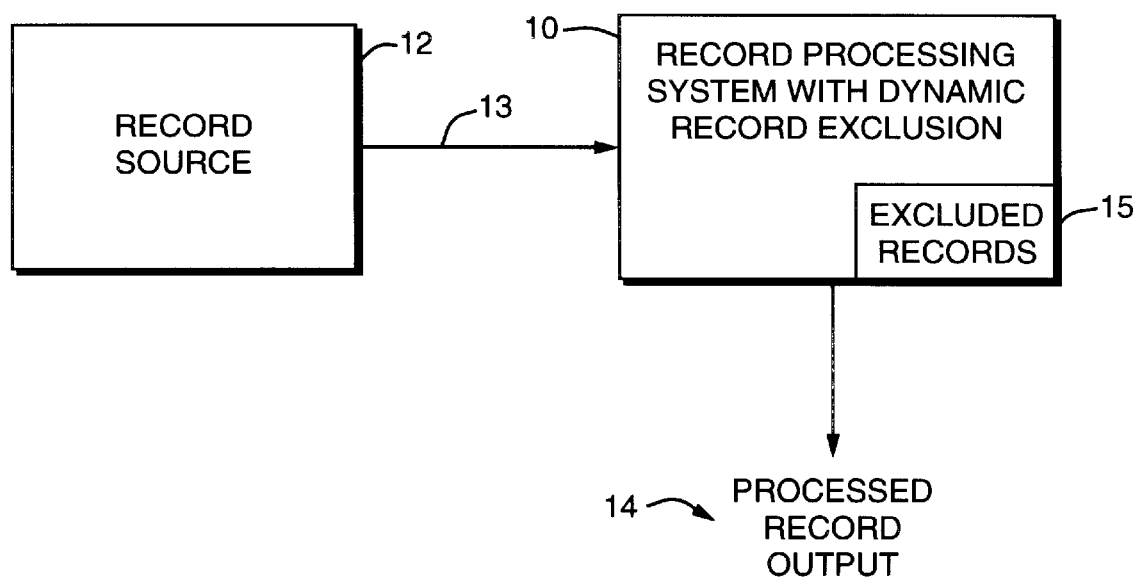
FIG. 1 is a schematic block diagram of a record processing system with dynamic record exclusion in accordance with the present invention.

The present invention features a data record processing system with dynamic data record exclusion 10, FIG. 1, which receives one or more data records from a data record source 12 such as a host computer, data base, data storage system, or other similar source of data records. The record processing system with dynamic data record exclusion 10 in accordance with the present invention, processes a received data record to determine if the received data record was previously received. The system of the present invention determines if the received data record should be excluded 15 or processed, and provides a data record output 14 which is a data record to be processed, as will be explained in greater detail below.

The present invention will be explained utilizing a telephone call record processing system as an exemplary system, although this is not a limitation of the present invention as any data record processing system can benefit from the invention disclosed herein. For purposes of explaining the present invention, the preferred embodiment contemplates that data records will be stored, before being processed, in more than one (1) location that is, there may be multiple "versions"of a data record relating to the same "account", matter, etc.

In such a telephone call record processing system, the telephone call record processing system with dynamic record exclusion receives, from a record source 12 such as a host computer, one or more data records including customer account information and a telephone number of a party to be called. Based on certain information including one or more of: time of receipt of the data record, data record batch or cycle transfer number; account number; telephone number; etc., the record processing system with dynamic data record exclusion 10 of the present invention determines whether or not a previous data record relating to the same account was previously received. If a data record for the same account number, telephone number etc. was previously received, the data record processing system with dynamic data record exclusion 10 of the present invention marks the previously received data record for the account as "to be excluded", "to be discarded" or otherwise provides some indication, indicia or setting or takes some form of action that prevents the processing of the previously received record for the same account number.

Figure 2:
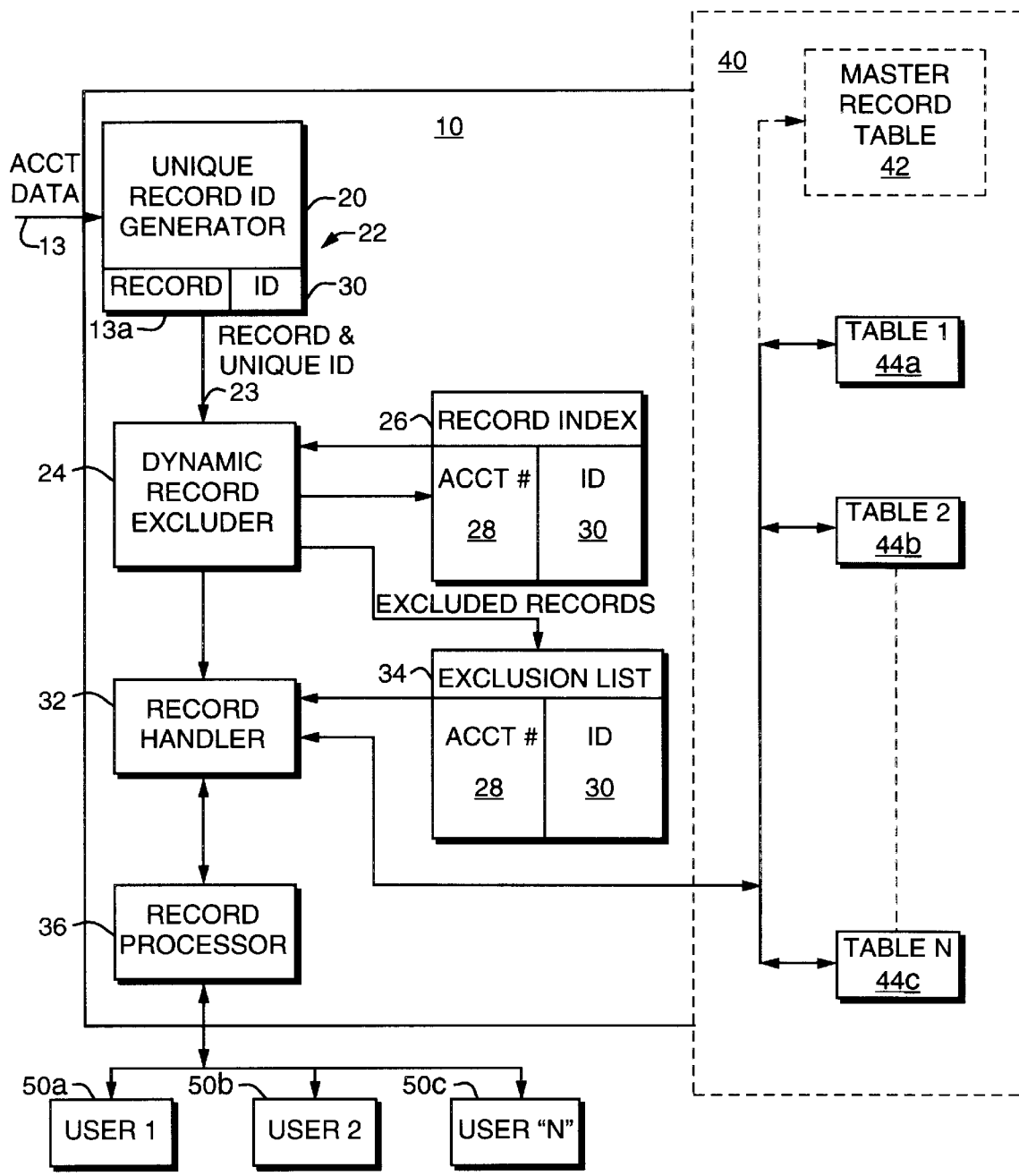
FIG. 2 is a more detailed block diagram of a record processing system with dynamic record exclusion in accordance with the preferred embodiment of the present invention.

The preferred embodiment of the data record processing system with dynamic data record exclusion 10, FIG. 2, according to the present invention, is shown in greater detail and includes one or more locations in which data records may be stored. In such a system, it is not generally practical to scan each and every data record storage location for previously received data records for the same "account" or "matter" and therefore, a data record exclusion list will be generated and checked before any previously received and stored record is processed, as will be explained below.

The data record processing system with dynamic data record exclusion 10 includes a unique record identification generator 20 which receives data records 13 from a data record source as previously described. The unique data record identification generator 20 receives the data records 13 and assigns a unique record identification to each data record. Alternatively, the unique record identification 30 can be received along with the account or record data 13.

In the preferred embodiment, the unique data record identification generator 20 utilizes a portion of the received data record such as account number, telephone number or other indicia which serves to uniquely identify a party, account, data record etc., about which the data record refers. In addition to the unique account information, the unique record identification generator 20 appends additional information to generate the unique data record identifier 22. For example, appended information may include a date indication; time of day indication; date of record transfer/transfer batch indication; data processing system processing cycle information; or other similar equivalent indicia which will serve to allow the present invention to determine whether a previous data record has been received so as to determine if a previously received data record for the present "account" or matter should be excluded from processing.

For exemplary purposes only, if a data record includes an account number, the unique data record identification generator 20 may utilize the account number as the first portion of the unique identifier for the data record, and one or more of the indicia set forth above as the second portion. For example, assuming a data record account number of "6666" the unique data record identification generator 20 may generate and provide a unique record identifier of "666609, wherein 09" is the cycle number, batch number or similar information relative to a receipt of the data record by the system of the present invention. The unique data record identifier is appended to and/or included with the received data record 13a as shown generally by 22, and provided to the dynamic data record excluder 24 over path 23.

Upon receipt of the data record with embedded or appended unique data record identifier 22, the dynamic data record excluder 24 scans data record index 26 utilizing one or more portions of the unique data record identifier previously generated to determine if a previous "version" of a data record for the same "account" was received prior to receipt of the current record.

In the preferred embodiment, the dynamic data record excluder 24 searches the data record index 26 utilizing the account number portion 28 of the unique data record identifier 22. Utilizing the example set forth above, the dynamic record excluder 24 will search the data record index 26 looking for account number portion 28 equal to "6666". If no match is found, indicating no previous data record for the same account was received, the dynamic record excluder 24 will store both the account number portion 28, and the identification portion 30 of the unique data record identifier in the data record index 26 for later reference and searching.

If the dynamic data record excluder 24 discovers a matching account number 28 or similar unique data record identification key portion in the data record index 26 indicating that a previous data record for the same account was received, the dynamic data record excluder 24 will retrieve the identification portion 30 of the unique data record key stored in data record index 26 and store both the account number 28 and the appended or separate identification portion 30 in the record exclusion list 34.

For example, as previously mentioned with regard to a telephone call record processing system, if the user of such a system is concerned with contacting credit card holders with a view toward detecting potential credit card fraud as early as possible, it is important for the data record processing system 10 of the present invention to be able to assign and control telephone call record processing in light of the most recently received data record or information relating to a given account and in light of the priority or probability for fraud assigned to given account.

For example, a first received data record relating to account number "6666" may include a unique record identifier portion 30 having a value "03". The unique identifier portion 30 value illustrated as "03" may be derived from the cycle or batch number of the received data record, as contemplated by one embodiment of the present invention or alternatively, may reflect a "score" assigned to the data record by the data record source indicating the "probability" of credit card fraud. Such score can be based on, as previously mentioned, the likelihood or potential for credit card fraud as well as other criterion. The initial "score" may be derived from processing information on credit card purchases of a previous day or previous hour. In the preferred embodiment, the data records are stored in a table or other data storage area grouped by "score" so that orderly processing of the data records can occur based upon the score. Accordingly, tables 44a–44c are provided in which data records having the same score are grouped. In this manner, data records with the highest priority are grouped together and can be processed (called) before data records with a lower priority are processed. Once all data records with the highest priority are processed, data records with the next highest level of priority (score, time of receipt, etc.) can be processed.

As processing of credit card or other similar information continues during the day, the source of the data records 12 may compute a new "score" for a given "account" which may yield a higher "score" that is, a higher probability of credit card fraud. In this instance, it is desirable to process the most recent data record with the most recent "score" particularly if the telephone call processing system can process the record with the higher "score" sooner than all records with a lower "score" or priority. Conversely, if the "score" for a given data record decreases or goes to "zero" (potentially indicating that the owner of the card has been called or has called in), it is desirable not to call the account based on some older information but rather, act on the newest information whereby the account will not be called at all. Additional uses or variations on the present invention are contemplated and within the scope of the present invention.

If the dynamic record excluder 24 determines that there is no data record to exclude, the data record with appended unique identifier is transferred to a data record handler 32 which stores the data record and appended unique record identifier in one or more data record tables 40. In one embodiment, the one or more data record tables 40 are an integral part of the data record processing system with dynamic data record exclusion 10, while in another embodiment, the data record tables 40 may be external to the data record processing system with dynamic data record exclusion 10. Additionally, other variations are contemplated without departing from the scope of the present invention.

The data record tables 40 may include one master data record table 42 as will be explained below or more preferably, a plurality of data record tables 44a–44c. In the embodiment described above wherein the present invention is utilized with a telephone call processing system in which each telephone call data record is assigned a priority level, cycle number, batch number or score, the record handler 32 will store the data records an appended or embedded unique data record identifier in one of the tables 44–44c grouped together with other data records of similar cycle number, batch number, priority level or score.

For example, all data records with a score, priority level, etc. of "1" would be stored in table "1", 44a. Similarly, all data records with unique identifiers equal to cycle, batch or score of "2" would be stored in table 2, 44b, etc. This arrangement facilitates telephone call record processing as disclosed in above and as further disclosed in U.S. Pat. No. 5,495,523 assigned to the assignee of the present invention and incorporated herein by reference.

In one embodiment, if the dynamic record excluder 24 determines upon examining or scanning the data record index 26 that there is a previous entry with the same account number portion 28, the dynamic data record excluder 24 proceeds to compare the identifier portion 30 stored in the data record index 26 with account number portion 28 to the just generated identifier portion 30 received from the unique data record identification generator 20. As previously mentioned, if the identification portion 30 is cycle number, batch number, time, or the like, the dynamic data record excluder will determine that the earlier version of the received data record should be excluded and will generate an indication that a particular account number with a predetermine identifier portion 30 should be excluded from any further processing, and store the account number 28 and identification portion 30 in the exclusion list 34.

It is contemplated that exclusion can be based on batch number, cycle or time since it is generally believed to be more desirable or preferred to utilize the most current or recent data record to process. In such a manner, if a most recently received data record indicates that, in a telephone call record processing application, a particular customer has been previously called and determined that there is no credit card fraud, the data record processing system with data record exclusion of the present invention would exclude the previously received record and discard the most recently received data record.

The data record processing system with dynamic data record exclusion 10, of the present invention, will, at a pre-determined time and/or under control of one or more users 50a–50c, initiate the data record processor 36 to process one or more data records. Record processor 36 will request one or more data records from record handler 32. Data record handler 32 will retrieve one or more data records from one or more data record tables 44a–44c. Once the data record is retrieved, data record handler 32 will examiner or search the data record exclusion list 34 for a matching account number portion 28. If the data record handler 32 locates a matching account number portion 28 in the record exclusion list 34, the data record handler will mark the previously retrieved data record as "excluded from processing" and will place the account number 28 and identification portion 30 in the record exclusion list 34.

As previously mentioned, the exemplary embodiment of the present invention is directed for use with a telephone call processing system such as a "UNISON®" call processing system available from Davox Corporation of Westford, Mass., which description is incorporated herein by reference. The present invention is also usable with other call record processing systems as well as other data and record processing systems. Additionally, the preferred embodiment of the present invention contemplates that the unique data record identification generator 20, dynamic data record excluder 24, data record handler 32 and data record processor 36 be implemented as primarily computer software, although it is contemplated that the present invention can be implemented in computer hardware, firmware and various combinations thereof, as well known in the art. Additionally, the preferred embodiment of the present invention contemplates that the data record index 26, data record exclusion list 34, and data record tables 44 are data structures stored in short or long term data storage such as semi-conductor memory, or computer disk drives, as well known in the art.

Figure 3:
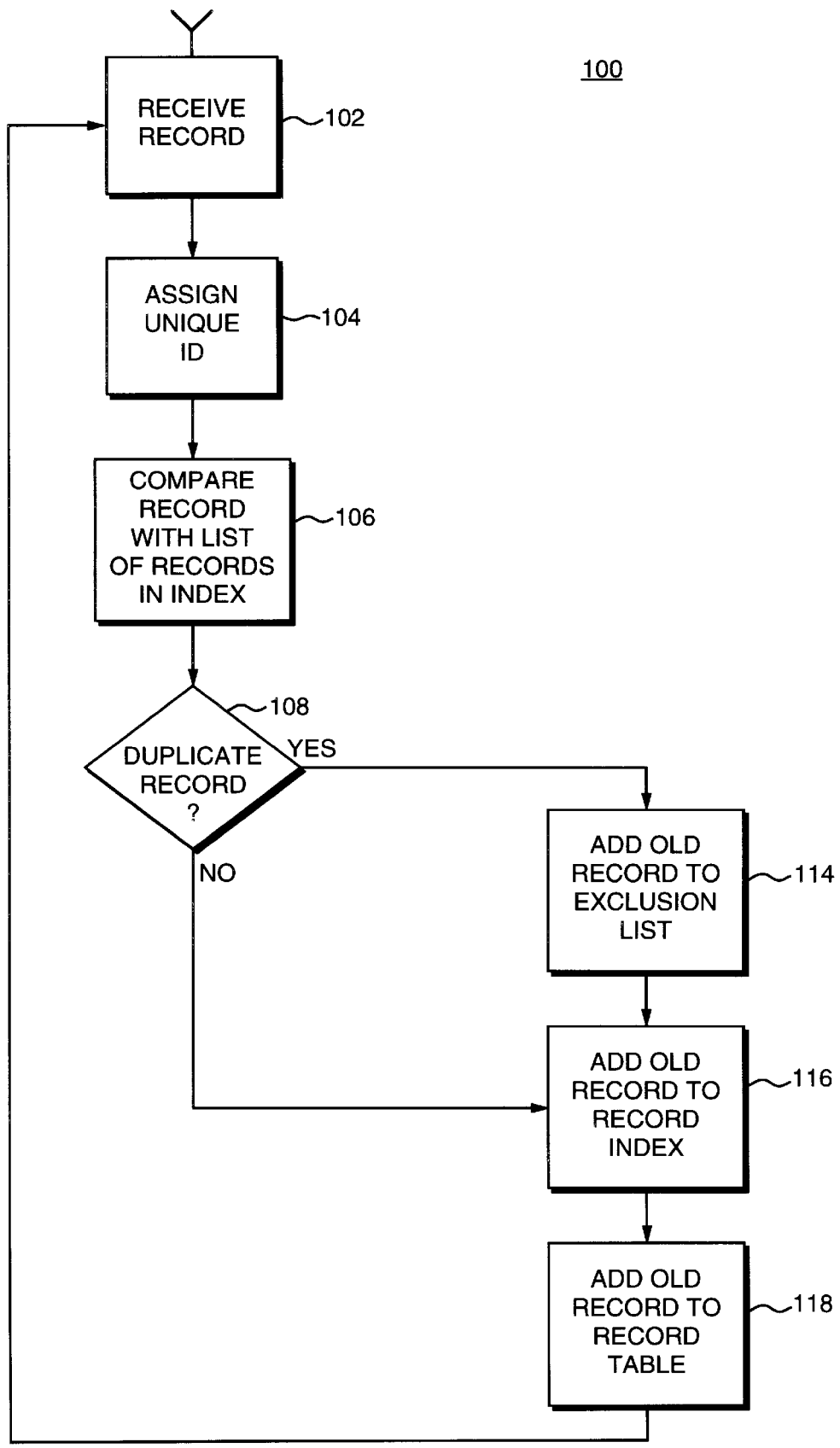
FIG. 3 is a flow chart illustrating the steps performed in dynamically excluding a record in accordance with the method of the present invention.

The method of providing dynamic record exclusion is shown generally at 100, FIG. 3 and begins by first receiving a data record from a record source 12, step 102. In one embodiment, subsequent to receiving a data record, the method of the present invention utilizes a unique data record identification generator 20 to assign a unique data record identifier, step 104. Alternatively, the unique data record identifier can be received from the data source.

After assigning a unique record identifier, the method of the present invention utilizes the dynamic record excluder 24 to compare that account number portion 28 of the assigned unique record identifier with the record identifiers stored in data record index 26, step 106. If, at step 108 the dynamic data record excluder 24 determines that there is a duplicate or previous entry for the same account number in the data record index 26, the dynamic data record excluder 24 transfers the data record indicia 28,30 of the previously received data record retrieved from the record index 26 to the exclusion list 34, step 114, while the new data record indicia 28,30 is added to/updated in the record index 26, step 116 before the full data record is stored in one or more data tables 40 by the data record handler 32, step 118.

It should be noted that the present method contemplates that if there is no duplicate record disclosed at step 108, the recently received data record has its unique identifying indicia added to the data record index 26, at step 116 prior to having the data record added to a data record table, step 118.

Figure 4:
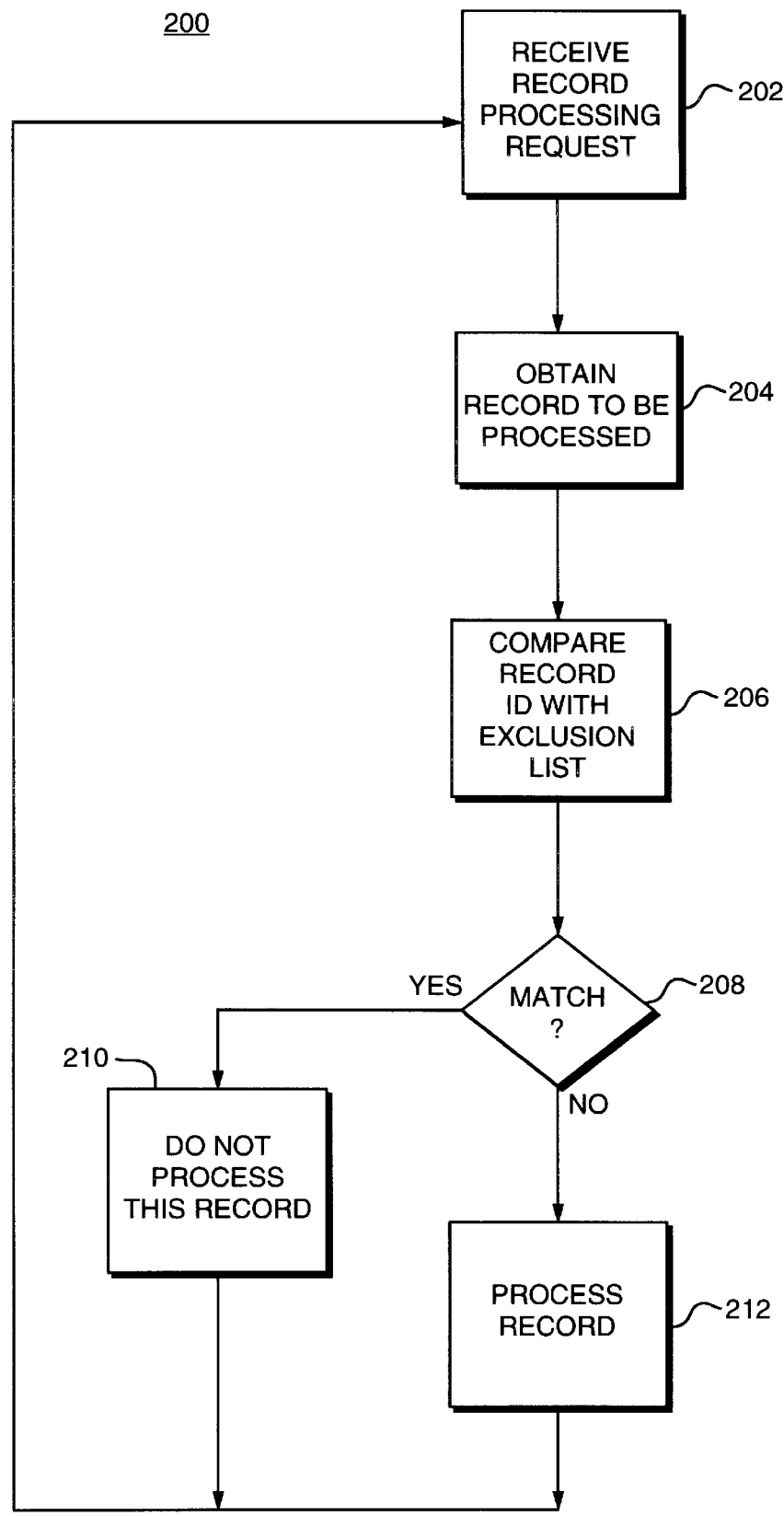
FIG. 4 is a flow chart of the steps the data record processing system with real time data record exclusion in accordance with the present invention.

The method for processing data records utilizing dynamic data record exclusion according to the present invention is shown generally at flow chart 200, FIG. 4 and includes first receiving a data record processing request from a user or based on a particular event or period of time, step 202. After the data record handler 32 obtains a data record to be processed, step 204, the dynamic data record excluder 24 compares the data record identification portion of the data record to be processed with the entries in the date exclusion list 34, step 206. If the dynamic data record excluder 24 determines that there is a match between the unique record identifier contained with or appended to the data record to be processed and one or more entries in the data record exclusion list 34, step 208, the retrieved record to be processed is discarded and not processed, step 210. Alternatively, if at step 208 the dynamic data record excluder 24 determines that there is no match, the record is processed by the data record processor 36, step 212.

It is helpful in describing the present invention to describe more fully the usefulness of the invention in conjunction to a telephony call processing system. In the preferred embodiment, it is contemplated that the present invention can be particularly useful in a credit card fraud processing situation. In such a preferred embodiment, utilizing the Davox® Unison® brand telephony call processing system, the telephony call processing system arranges all the received call records by "score", each group of call records in a given table (40, 44) having the same score.

A telephone call campaign is created which is a telephony system processing setup to handle fraud telephone call processing. Telephony system "campaigns" are known to those skilled in the art and are described in the co-pending U.S. patent applications referenced herein. When a telephony system operator "logs onto" the credit card fraud processing campaign, the campaign logs the operator onto the call table (40,44) with the highest priority. All the call records in the call table with the highest priority are processed. Once all the call records in the highest priority or "score" table are processed, the fraud processing campaign automatically transfers or "flows" the operator onto processing the call record table with the next highest call processing priority or score. In this manner, all calls with the highest "score" that is, the highest probability of credit card fraud, are processed before call records with lower scores or probabilities of fraud.

During the processing of each call record, the telephony call record processing system determines whether the call record to be processed should be excluded, as disclosed and claimed herein. Additionally, should any given call record table be completely processed, the call record table is not "closed" but merely goes inactive and will immediately be re-activated upon one or more call records being inserted into a call record table having a higher priority that the call record table being processed at any one given point in time.

Accordingly, the present invention provides a unique and novel record processing system with dynamic data record excluder, which allows only the most current data record for a given account/matter to be processed while excluding previously received data records which may be scheduled for processing in the near future.

Modifications and substitutions by one of ordinary skill in the art are considered to be within the scope of the present invention which is not to be limited except by the claims which follow.

What is claimed is:

1. A dynamic record excluder system comprising:
   a unique record identifier generator, responsive to at least one received data record, for generating a unique data record identifier;
   a data record index, for storing at least a portion of said received data record and said generated unique data record identifier;
   a dynamic data record excluder, responsive to said received data record and to said unique data record identifier, for determining whether at least a portion of said received data record was previously received and stored in said data record index, and responsive to said determination that said at least a portion of said received data record was previously received, for generating at least one data record exclusion indicator providing an indication that at least one of said received data record and said previously received data record should be excluded from record processing; and
   a data record exclusion list, responsive to said dynamic record excluder, for storing said generated data record exclusion indicator.

2. The dynamic record excluder system of claim 1 wherein said received data record includes a data record priority indicator.

3. The dynamic record excluder system of claim 1 wherein said data record exclusion indicator includes said generated unique data record identifier.

4. The dynamic record excluder system of claim 3 wherein said data record exclusion indicator includes a data record priority indicator.

5. The dynamic record excluder system of claim 4 wherein said unique data record identifier includes a data record identifier portion.

6. The dynamic record excluder system of claim 5, wherein said unique data record identifier includes a time identification portion.

7. The dynamic record excluder system of claim 6, wherein said unique data record identifier includes a date identification portion.

8. The dynamic record excluder system of claim 6, wherein said unique data record identifier includes a data processing cycle identification portion.

9. The dynamic record excluder system of claim 6, wherein said unique data record identifier includes a data processing batch identification portion.

10. The dynamic record excluder system of claim 1, wherein said dynamic data record excluder compares a data record priority indicator in said received data record with a data record priority indicator in said previously received data record, for generating said record exclusion indicator.

11. The dynamic record excluder system of claim 1, wherein said dynamic date record excluder excludes said previously received data record in response to a determination that at least a portion of said received data record was previously received.

12. A data record processing system with dynamic data record exclusion, said data record processing system comprising:
   a unique record identifier generator, responsive to at least one received data record, for generating a unique data record identifier;
   a data record index, for storing at least a portion of said received data record and said generated unique data record identifier;
   a dynamic data record excluder, responsive to said unique data record identifier and to said data record index, for determining whether at least a portion of said received data record was previously received, and responsive to said determination that said at least a portion of said received data record was previously received, for generating at least one data record exclusion indicator providing an indication that at least one of said received record data and said previously received record data should be excluded from record processing;
   a data record exclusion list, responsive to said dynamic record excluder, for storing said generated data record exclusion indicator;
   a data record handler, responsive to said dynamic data record excluder and to said record exclusion list, for storing said received data records in at least one data record table, and for comparing at least a portion of a data record to be processed with data record exclusion indicators stored in said record exclusion list; and
   a data record processor, responsive to a request for processing a data record, for directing said data record handler to retrieve at least one data record to be processed, and for directing said data record handler to compare said retrieved at least one data record to be processed with said data record exclusion indicators stored in said record exclusion list, and responsive to said comparison indicating that said data record requested to be processed is non-excluded, for processing said data record requested to be processed.

13. The data record processing system of claim 12 wherein said data record processor includes a telephone call processor.

14. The data record processing system of claim 13 wherein said received data records include a data record priority indicator.

15. The data record processing system of claim 14 wherein said priority indicator includes a value based on the urgency in which an account must be called.

16. The data record processing system of claim 15 wherein said urgency value is based on the potential for credit card fraud.

17. The data record processing system of claim 13 wherein said data record exclusion indicator includes said generated unique data record identifier.

18. A method of dynamically excluding data records to be processed, said method including:
   generating a unique data record identifier in response to at least one received data record;
   storing at least a portion of said received data record and said generated unique data record identifier in a data record index;
   determining whether at least a portion of said received data record was previously received; and
   responsive to said determination that at least a portion of said received data record was previously received, generating a data record exclusion indicator providing an indication that at least one of said received data record and said previously received data record should be excluded from data record processing.

19. The method of claim 18 further including before this step of generating a data record exclusion indicator, the step of comparing a data record priority indicator in said received data record with a data record priority indicator in said previously received data record, for generating said record exclusion indicator.

20. A method for processing data records utilizing dynamic data record exclusion, said method comprising the steps of:
   generating a unique data record identifier in response to at least one received data record;
   storing at least a portion of said received data record and said generated unique data record identifier in a data record index;
   determining whether at least a portion of said received data record was previously received;
   responsive to said determination that at least a portion of said received data record was previously received, generating a data record exclusion indicator providing an indication that at least one of said received data record and said previously received data record should be excluded from data record processing;
   storing said received data records in at least one data record table;
   responsive to a request for processing a data record, directing a data record handler to retrieve at least one data record to be processed;
   comparing said retrieved at least one data record to be processed with said data record exclusion indicators stored in said data record exclusion list; and
   responsive to said comparison indicating that said data record requested to be processed is not excluded, processing said data record.

21. The method of claim 20 wherein said record processing system includes a telephone call processing system.

22. A dynamic record excluder comprising:
   a data record index, responsive to at least one received data record, for storing at least a portion of said received data record and a received unique data record identifier;
   a dynamic data record excluder, responsive to said unique data record identifier and to said data record index, for determining whether at least a portion of said received data record was previously received, and responsive to said determination that said at least a portion of said received data record was previously received, for generating a data record exclusion indicator providing an indication that at least one of said received record data and said previously received record data should be excluded from record processing; and
   a data record exclusion list, responsive to said dynamic record excluder, for storing said generated data record exclusion indicator.

23. A telephone call record processing system with real time call record processing priority updating, said system comprising:
   a unique record identifier generator, responsive to at least one received call record having an account number, for generating a unique record identifier to be associated with said account number, said unique record identifier including a data record priority indicator;
   a record index including a plurality of account numbers and a plurality of associated unique record identifiers corresponding to a plurality of previously received call records;
   a dynamic record excluder, responsive to said account number and said unique record identifier of said received call record, for determining whether said account number of said received call record matches one of said plurality of account records stored in said record index, and if said account number of said received call record matches a matching one of said plurality of account records, for comparing said unique record identifier of said received call record to a unique record identifier associated with said matching one of said plurality of account numbers stored in said record index, and for storing at least one of said account number of said received call record and said matching one of said plurality of account numbers in an exclusion list with said associated unique record identifier, and wherein said dynamic record excluder stores said account number and said unique record identifier of said received call record in said record index;
   a record handler, responsive to said dynamic record excluder and said exclusion list, for storing said received call record in one of a plurality of call record tables based upon said data record priority indicator associated with said received call record, and for comparing call records in said plurality of call record tables with said account numbers and said unique record identifiers stored in said exclusion list; and
   a record processor, responsive to a request for processing a call record from one of said plurality of users, for directing said record handler to retrieve at least one call record to be processed from one of said plurality of call record tables, and for directing said record handler to compare an account number and unique record identifier of said at least one call record to be processed with said account numbers and unique record identifiers stored in said exclusion list, wherein said record processor processes said at least one record to be processed if said account number and said unique record identifier of said at least one record to be processed are not stored in said exclusion list.

24. The system of claim 23 wherein said data record priority indicator of said unique record identifier includes a fraud potential indicator, wherein said received record is stored in one of said plurality of call record tables based upon said fraud indicator, and wherein said record processor directs said record handler to retrieve call records having fraud potential indicators indicating a high potential of fraud from one of said call record tables.

* * * * *